Figure 1:
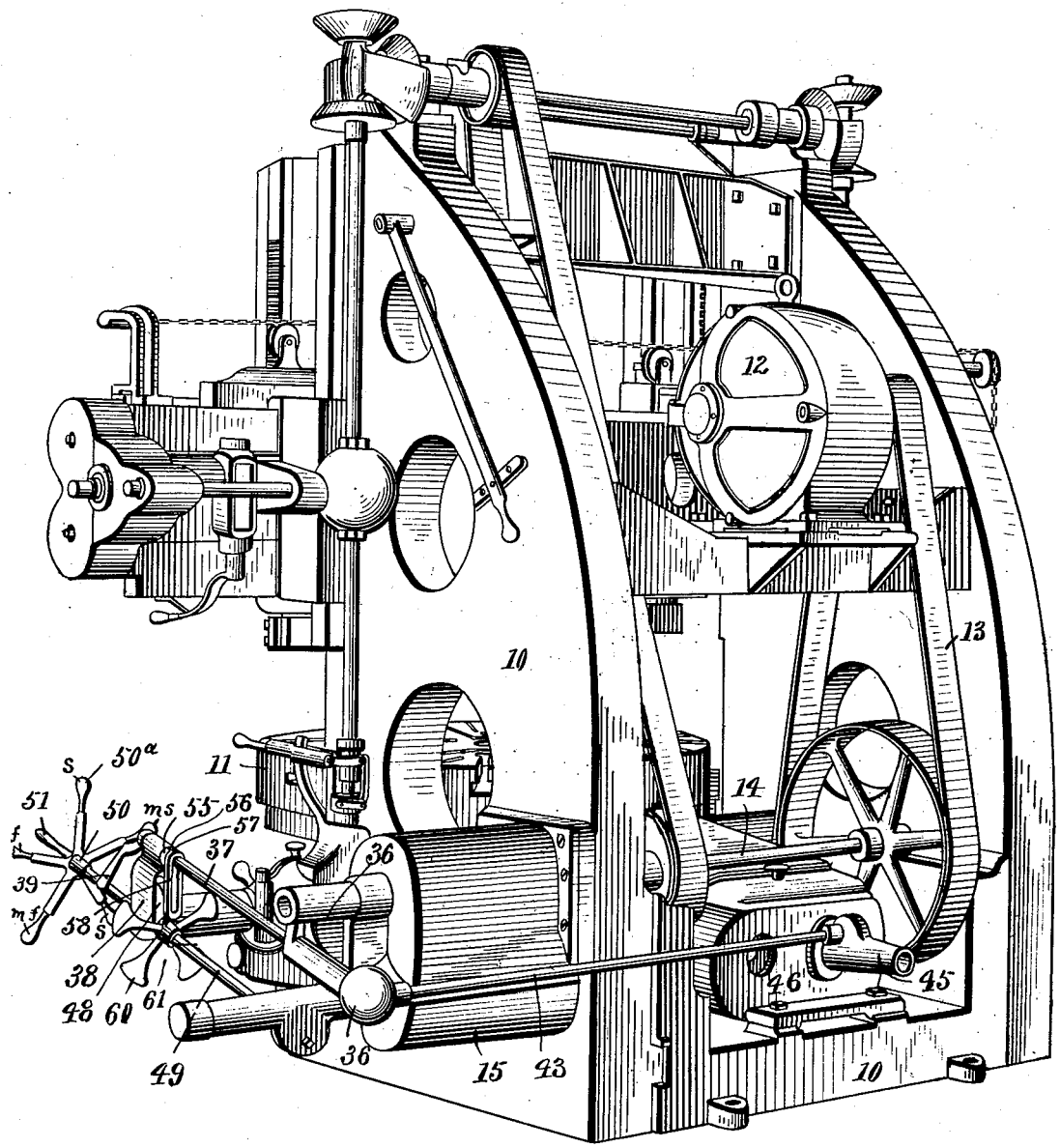

No. 862,075. PATENTED JULY 30, 1907.
E. HENRIKSON.
SPEED BOX AND BRAKE OPERATING MECHANISM.
APPLICATION FILED APR. 16, 1906.

4 SHEETS—SHEET 1.

WITNESSES:

INVENTOR
*Emanuel Henrikson*

BY *Chamberlain & Newman*
Attorneys

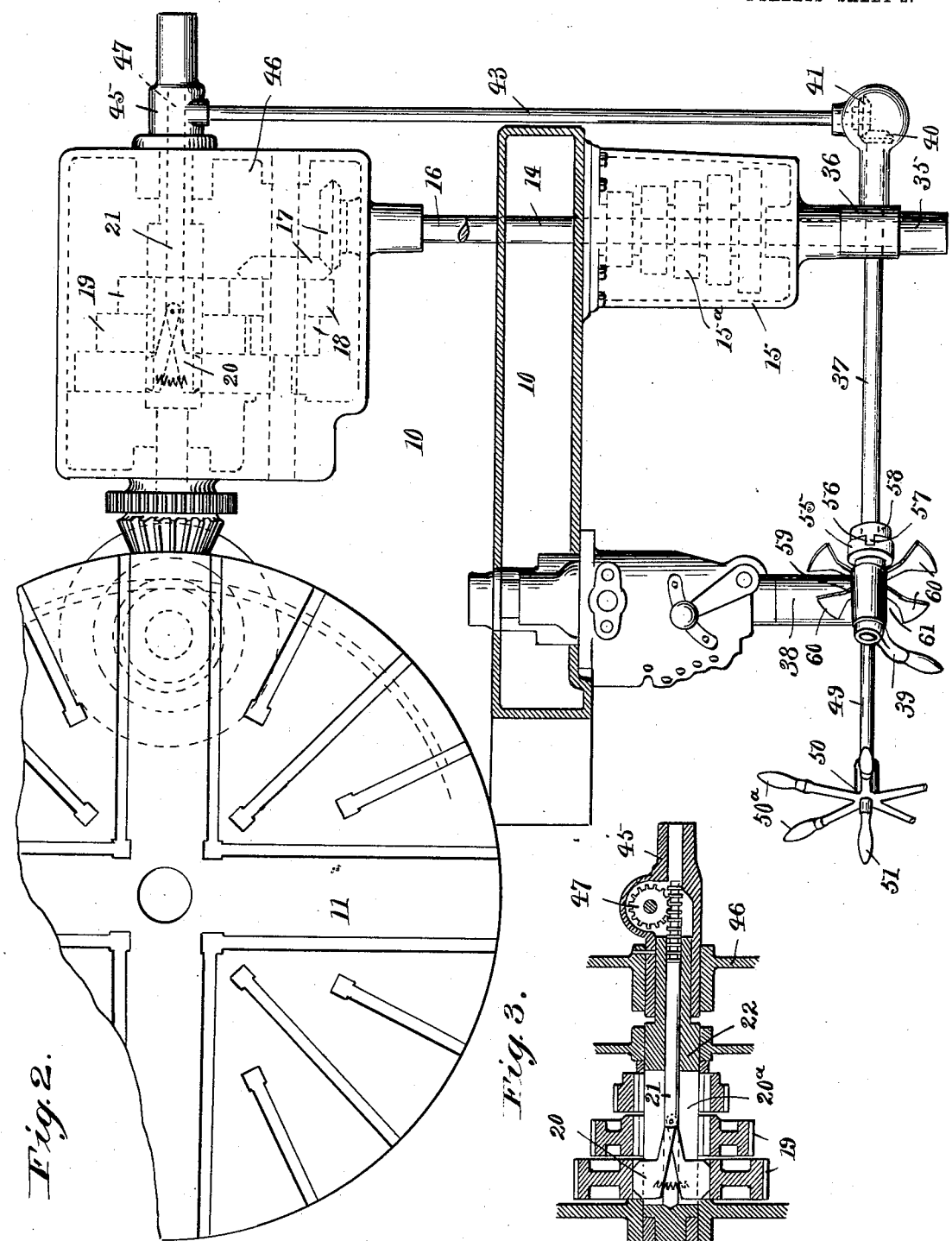

No. 862,075.  
PATENTED JULY 30, 1907.
E. HENRIKSON.  
SPEED BOX AND BRAKE OPERATING MECHANISM.  
APPLICATION FILED APR. 16, 1906.
4 SHEETS—SHEET 3.
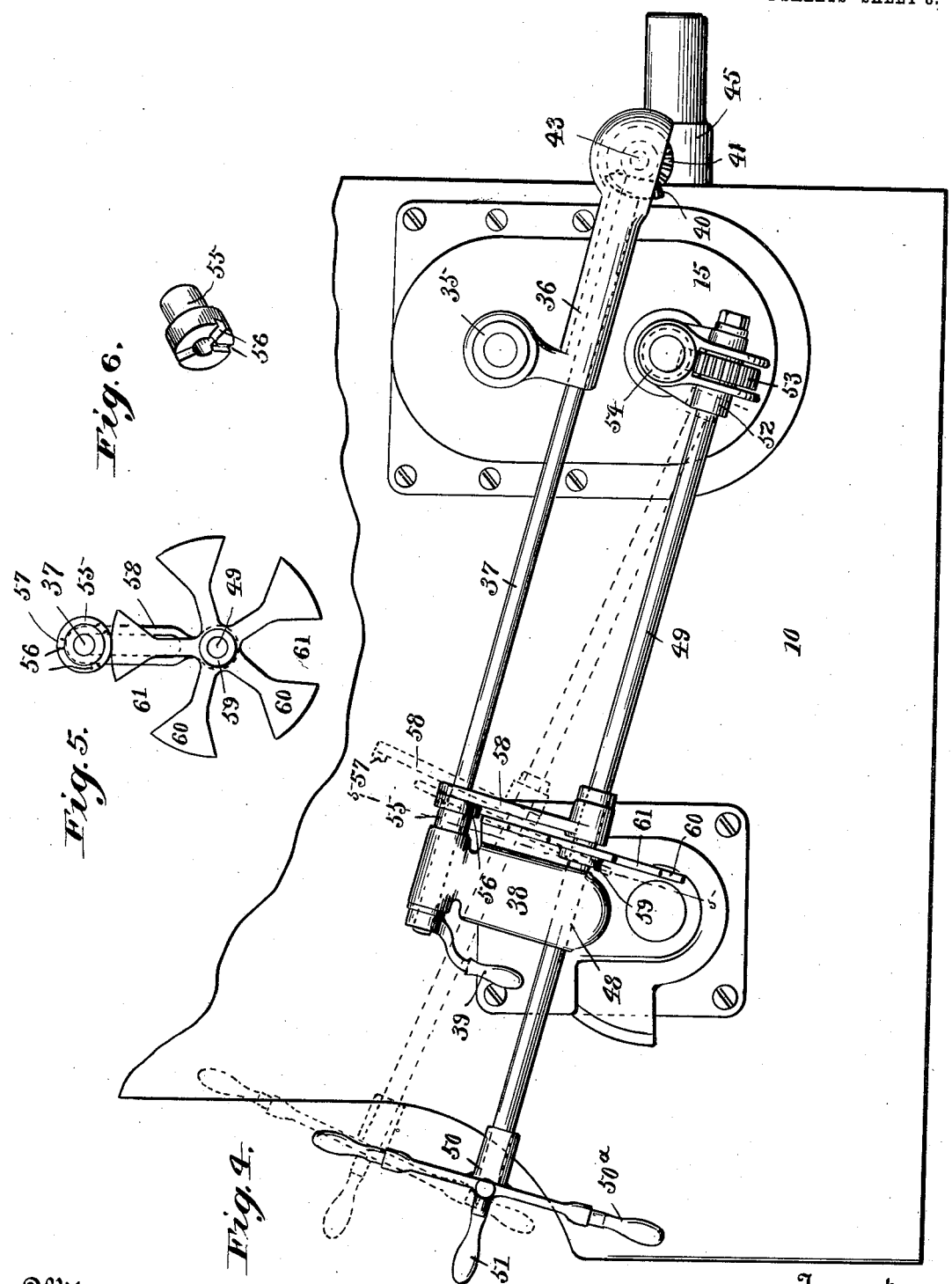

No. 862,075. PATENTED JULY 30, 1907.
E. HENRIKSON.
SPEED BOX AND BRAKE OPERATING MECHANISM.
APPLICATION FILED APR. 16, 1906.
4 SHEETS—SHEET 4.
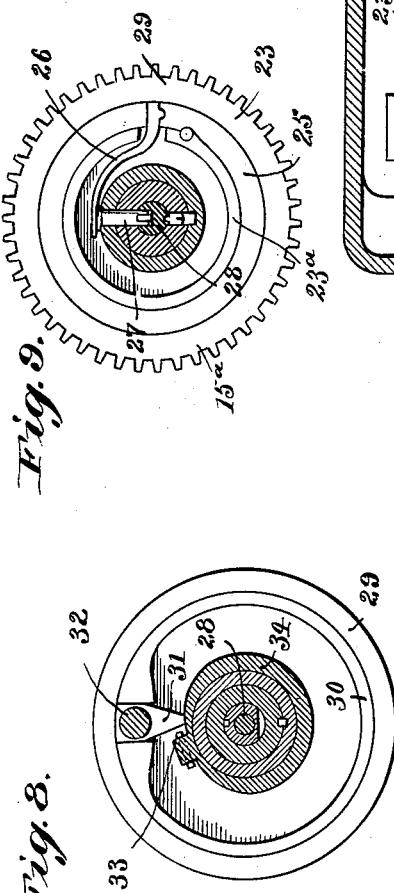
Witnesses
R. H. Newman
Ruth Raymond
Inventor
Emanuel Henrikson
By Chamberlain & Newman
Attorneys

UNITED STATES PATENT OFFICE.

EMANUEL HENRIKSON, OF BRIDGEPORT, CONNECTICUT, ASSIGNOR TO THE BULLARD MACHINE TOOL COMPANY, OF BRIDGEPORT, CONNECTICUT, A CORPORATION OF CONNECTICUT.

SPEED-BOX AND BRAKE-OPERATING MECHANISM.

No. 862,075.  Specification of Letters Patent.  Patented July 30, 1907.

Application filed April 16, 1906. Serial No. 311,915.

*To all whom it may concern:*

Be it known that I, EMANUEL HENRIKSON, a citizen of the United States, and a resident of Bridgeport, in the county of Fairfield and State of Connecticut, have invented certain new and useful Improvements in Speed-Box and Brake-Operating Mechanism, of which the following is a specification.

This invention relates to driving mechanism for machine tools such as boring mills, lathes and special machinery and refers more particularly to means for operating and controlling such driving mechanism.

It is the purpose of the invention to provide a simple efficient and durable device for operating clutches to change from one speed to another and likewise to quickly operate a brake to stop the movement of the machine; to provide means whereby the brake mechanism can not be applied while any of the several clutch mechanism are in engagement and likewise to insure the release of the brake in advance of the operation of the clutch, and further to provide a device by means of which it may readily be determined, which of the several clutches are engaged, and finally to provide a secondary clutch mechanism whereby the several speeds of the first named speed clutch mechanism may be further subdivided to multiply the number of speeds obtainable and also to provide connection for operating said second series of clutches.

With the above and other objects in view my invention resides and consists in the novel construction and combination of parts shown upon the accompanying four sheets of drawing forming a part of this specification and upon which;

Figure 1, shows a rear perspective view of a boring mill fitted with my improved speed box and brake controlling mechanism. Fig. 2, is a sectional plan view of a portion of the base of the machine shown in Fig. 1, and illustrating my improved controlling device as applied to the driving mechanism thereof. Fig. 3, is a detail sectional plan view of the clutch mechanism indicated by dotted lines within the casing as shown in Fig. 2. Fig. 4, shows on a slightly enlarged scale, a side elevation of a portion of the mill and my improved speed and brake handling device as applied thereto. Fig. 5, is a cross sectional elevation taken on line 5—5 of Fig. 4, and illustrating the interlocking connections intermediate the two operating shafts. Fig. 6, is a detail perspective view of a notched collar fixed to the upper operating shaft. Fig. 7, is an enlarged longitudinal vertical sectional view of a changeable speed box and brake mechanism through which the mill is driven, and which mechanism are controlled by my improved connections. Fig. 8, shows a cross sectional elevation taken on line 8—8 of Fig. 7, of the brake embodied in Fig. 7, and Fig. 9, is a similar sectional elevation through one of the clutches comprising the changeable speed mechanisms embodied in Fig. 7.

For convenience of illustration I have shown my speed box and brake controlling mechanism in connection with one of the improved types of boring mills manufactured by The Bullard Machine Tool Company, assignees of this application, but it will be obvious of course that my said mechanism is not only equally applicable to other types of machines manufactured by this same company, but is also applicable to various types of machine tools in general, which are driven through changeable speed and brake mechanism. It is also true that my improved interlocking controlling mechanism may be applied to various forms of combined clutch and brake mechanism from that and therefore I do not wish to confine the use of my invention to either the particular style of boring mill, or speed and brake mechanisms shown herein.

Referring generally to the drawings and more particularly to Figs. 1 and 2, 10 indicates the frame of the boring mill including the base and side uprights, 11 the rotatable table upon which the work is retained and 12 an electric motor by means of which the entire operative parts of the machine may be driven. 13 indicates a belt by means of which the shaft 14 is connected and driven from the motor. From this shaft, connections are made to operate the several features of the machine, the main connection being through the changeable speed mechanism 15ª referred to, and contained within the casing 15 secured to the frame of the machine. From this changeable speed mechanism which will be again referred to, power is communicated through the shaft 16, bevel gears 17, cone gears 18 and clutch gears 19 to drive the table 11 in the usual or any preferred manner. The clutch gears 19 are adapted to be engaged by the spring actuated beveled jaws 20 of the toothed rod 21 carried within a slot 20ª of a shaft 22. This device obviously provides three different changes of speed for the table for each speed of the shaft 16, through the manipulation of the rod 21 and its jaws.

Referring to the speed mechanism contained within the casing 15 (see Figs. 7, 8 and 9) it will be noted that the shaft 14 extends into the casing and contains a series of cone gears 23 which serve to drive a like number of clutch gears 24 upon spiders 23ª secured to the lower shaft 16. The construction of the clutches of these gears are clearly shown in Fig. 9, and comprises an expandible ring 25 mounted within a flange of the gear and operated through a lever 26, and a pin 27 the latter being engaged by a slide rod 28 mounted in a bore of the shaft and having an inclined surface 28ª to engage the inner ends of the respective pins as desired. It being apparent that but one of the clutches can be engaged at a single instant and that when so engaged, power is communicated from one shaft to the other through the clutch and gear connections of that particular mechanism. Upon this same shaft 16 is mounted a brake device, comprising a friction disk 29 carrying therein an expandible ring 30, intermediate the ends of which is a rocker arm 31 secured to a stud 32 rotatably mounted within the casing in a way to hold the ring against rotation and likewise to expand the ring against the surface of the flange of the disk when the arm 31 of the stud is operated by the engagement of the lug 33 mounted on the sleeve 34 journaled within the casing and upon the hub of the disk 29.

From the foregoing construction it will be noted that the several clutches for the gear connections are operated by a longitudinal sliding movement of the operating rod 28 and that the brake is operated by a rocker or rotary movement of the sleeve 34, the brake disk obviously being carried with the shaft at all times, while the sleeve is only rockably mounted with relation thereto.
My improved connections therefore, are for the purpose of imparting several operative movements to these, or other clutch and brake mechanisms, whereby neither such clutch or brake mechanism can be set and operated to the detriment of the other. This operating mechanism is shown to some extent in each of the figures of the drawings, but will probably be best understood from reference to Figs. 3, 4 and 5. Upon an extended sleeve 35 secured within the casing 15 is pivotally hung a bracket 36 in which is journaled a rotary shaft 37, the forward end of said shaft being also journaled in a fixed bracket 38 secured to the side of the frame of the machine. Said shaft is provided with an operative handle 39 by means of which it may be rocked or rotated within its bearing, and upon the rear end of this rod is mounted a beveled pinion 40 which meshes with a similar bevel pinion 41 upon a rear shaft 43, one end of which is also journaled in said bracket 36 and the opposite end being journaled in the housing 45, secured to the casing 46 that incloses the gears 17, 18 and 19. Upon the ends of the shaft 43 and within the housing 45 is a pinion 47 that engages the rack of the slide rod 21 through which means the said rod is adjusted longitudinally by the operation of the handle 39 upon the forward end of the shaft 37.
The bracket 38 contains an elongated orifice 48 through which a second rotary shaft 49 operates. This shaft is the medium through which the primary speed mechanisms as well as the brake mechanism are operated and is designed to be both rotated and raised as indicated in full and dotted lines respectively, see Fig. 4. Said shaft carries a pilot wheel 50 upon its forward end that contains a series of five radially disposed operating handles 50ª for rotating the shaft, as well as a central handle 51 for lifting the shaft to set the brake, each handle or spoke representing a different speed. The rear end is journaled in suitable bearings 52 extended from the sleeve 34 before mentioned, and is further provided with a pinion 53 for engagement with the rack 54 journaled upon the slide rod 28. This obviously permits of the necessary longitudinal movements of the rod for the engagements of the respective clutches by the rotary movement of the shaft 49 imparted from and by the manipulation of the pilot wheel.
Upon the shaft 37 before mentioned is attached a collar 55 (see Figs. 4, 5 and 6) having a series of radial notches 56 therein, adapted for engagement by the lug 57 of the bifurcated arm 58 attached to the shaft 49. The purpose of this connection is obviously to prevent the rotation of the shaft 37, except when the shaft 49 is in a raised position and which also means a disengaged position of the clutches of the primary speed mechanism. Upon the shaft 49 is also mounted an interlocking disk 59 which comprises a series of radial arms 60 disposed at an equal distance apart forming pockets 61 intermediate of the arms, the purpose of which is to prevent the raising of shaft 49 and the engagement of the brake while the clutches of the primary speed mechanism are engaged and likewise to insure the disengagement of the clutches when operating the brake. The respective arms of the disk are so located with relation to the shaft 49 and the position of the raised surface 28ª of the slide rod, that the ends of said arms 60 normally register with the underside of the sleeve 55 of the shaft 37 when either of the said clutches are engaged, and that the respective pockets 61 intermediate of said arms likewise registers with said sleeve of said shaft when the raised surface of the slide rod is disengaged from the clutch and in a position intermediate of the pins of said clutches as will be obviously apparent. This location of the arms obviously prevents the shaft 49 from being raised when in said first named position directly beneath the shaft 37, but permits said shaft to be raised as indicated by dotted lines, Fig. 4, when either of said pockets register with said upper shaft.

It will thus be apparent that the several operative connections are so interlocked as to prevent any mishap to the driving mechanism and insures the several manipulations of the parts in their proper order in a very simple and desirable manner. It will also be noted that by reason of the particular number of clutches employed within the primary speed mechanism five different changes of speed from the main shaft 14 to the secondary shaft 16 are permissible, which I term "slow", "medium slow", "medium", "medium fast" and "fast." It is also true that three further subdivisions or change of speeds from each speed of said shaft 16 is possible, by reason of the three clutches contained within the casing 46, thus affording fifteen different changes of speed for the table and connected parts, any one of which may be quickly obtained by the operation of one or two levers as will be clearly understood.

The operation therefore of my device is as follows: Power is communicated to the shaft 14 through its belt connection from the motor, and the several gears 23 mounted on such shaft are thus driven together with the gear clutch members 24 upon the spiders of the lower shaft 16. This lower shaft may be connected to be operated through either of the gear clutch members by the rotation of the pilot wheel 50, and can be driven at any one of five different speeds according to which of the arms "s", "m s", "m" "m f" and "f" are brought to the top in a vertical position, said letters representing the several speeds which are designated as slow, medium slow, medium, medium fast, and fast. These drives as imparted to the shaft 16 may each be further divided by first slightly raising the arm 58 by the handle 51 to disengage the lug 57 from the notch 56 and then swinging the handle 39 around, rotating the shaft 37 to shift the engagement of the clutch jaws 20, whereupon the pilot wheel would be released and lowered to again engage the lug 57 with the notch 56 which has been brought into line therewith. If at any moment it is desirable to stop the machine, it may be accomplished by manipulating the same pilot wheel, by first slightly rotating the wheel to bring one of the pockets 61 of the disk to register with the upper shaft and then raising the pilot wheel and lower shaft thus turning the hub 34 to set the brake clutch as will be clearly apparent.

Having thus described my invention what I claim and desire to secure by Letters Patent is:—

1. The combination with a series of clutches and a brake, of a rotatable and pivoted shaft, and connections to respectively operate both said clutches and brake.

2. The combination with a series of clutches and a brake, of a slidable rod to operate the same, a rotary and pivoted shaft connected to operate the slide and connections with said shaft to also operate the brake.

3. The combination with a series of clutches, of a slidable rod to operate the same, a rotary shaft connected with the slide rod to operate the same, a pilot wheel upon the shaft having one spoke for each clutch within the series, and means with which the spokes may be made to register to determine which of the clutches are engaged.

4. The combination with a series of clutches, of a slidable rod to operate the same and bearing a rack, a bracket hung around the rod, a rotary shaft journaled in the bracket and having a pinion to engage and operate the rack, and means connected with the shaft for operating the same.

5. The combination with a series of driving clutches and a brake clutch, of a shaft connected to operate both the driving and brake clutches, means carried by the shaft to prevent its operation when either of the driving clutches are engaged.

6. The combination with a series of driving clutches and a brake clutch, of a rotatable shaft connected to operate the driving clutches and pivoted to operate the brake, and means carried by the shaft to prevent its pivotal movement when the driving clutches are engaged.

7. The combination with a series of driving clutches and a brake clutch, of a rotatable and pivotal shaft connected to operate both the driving and brake clutches by rotary and pivotal movements respectively, a device carried by the shaft to prevent its rotation when shifted to engage the brake.

8. The combination with a series of driving clutches and a brake clutch, of a rotatable and pivotal shaft connected to operate both the driving and brake clutches by rotary and pivotal movements respectively, and a device carried by the shaft to prevent its pivotal braking movement when in position to engage either of the clutches.

9. In a speed controlling device, the combination of changeable speed driving mechanism, a brake device connected therewith, a bracket pivoted to operate the brake, a rotatable shaft connected to operate the bracket, and adapted to rotate to change from one speed to another.

10. The combination with a series of driving clutches, a brake clutch connected therewith, a pivoted bracket to operate the brake, a slide rod within the bracket to operate the driving clutches, a rotary shaft journaled within the bracket and connected to operate the slide and also adapted to turn the bracket to operate the brake.

11. In a speed controlling device, the combination with changeable speed driving mechanism including a slide rod to engage the same, of a brake device connected to the driving mechanism, a bracket pivoted to operate the brake, a rotatable shaft journaled in the bracket adapted to turn the same, and a pinion upon the shaft to engage and operate the slide rod of the changeable speed mechanism.

12. In a speed control of the class described, the combination with a series of driving clutches and a brake, of a shaft rotatably and pivotally connected to respectively operate both said driving clutches and brake, an operating wheel upon the shaft, a disk also upon the shaft bearing an arm for each driving clutch of the series, and means to register with one of such arms to prevent the pivotal operation of the shaft to set the brake.

13. In a speed control of the class described, the combination with a series of clutches and a brake, of a shaft rotatably and pivotally connected to respectively operate said clutches and brake, an operating wheel upon the shaft, a disk also upon the shaft bearing an arm for each clutch of the series, and having pockets intermediate the arms, means to register with one of such arms to prevent the pivotal operation of the shaft to set the brake.

14. The combination of a changeable speed mechanism and a brake connected therewith, of a shaft connected to operate both the speed mechanism and brake, a secondary changeable speed mechanism, and a shaft for operating the same, an arm carried by the brake shaft to engage and prevent the operation of the secondary speed shaft.

15. The combination of a changeable speed mechanism and a brake connected therewith, a shaft connected to operate both the speed mechanism and brake, a secondary changeable speed mechanism, a shaft for operating the same, connections intermediate the two shafts whereby the latter shaft cannot be operated until released by the first named shaft.

16. The combination with a changeable speed mechanism and a brake connected therewith, of a shaft connected to operate both the speed mechanism and brake, a secondary changeable speed mechanism, a shaft for operating the same, an arm carried by the brake shaft to engage and prevent the operation of the secondary speed shaft, and means to cause the disengagement of the arm from the shaft with the swinging of the brake shaft.

17. The combination with a changeable speed mechanism and brake connected therewith, of an operating shaft therefor, a secondary changeable speed mechanism, a shaft to operate the same, a bracket in which the two shafts are supported, an arm carried by one of the shafts and bearing means to engage the other shaft to prevent its turning, and a disk with pockets to permit of the disengagement of such arm from the shaft when desired.

Signed at Bridgeport, in the county of Fairfield, and State of Connecticut, this 28th day of March, A. D. 1906.

EMANUEL HENRIKSON.

Witnesses:
W. J. LYNCH,
J. S. HUNTER.